United States Patent
Lakshminarayan et al.

(10) Patent No.: US 9,158,815 B2
(45) Date of Patent: Oct. 13, 2015

(54) ESTIMATING A NUMBER OF UNIQUE VALUES IN A LIST

(75) Inventors: Choudur Lakshminarayan, Austin, TX (US); Joe Robert Hill, Austin, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 670 days.

(21) Appl. No.: 12/907,325

(22) Filed: Oct. 19, 2010

(65) Prior Publication Data

US 2012/0095989 A1    Apr. 19, 2012

(51) Int. Cl.
*G06F 7/00* (2006.01)
*G06F 17/30* (2006.01)
*G06F 17/18* (2006.01)

(52) U.S. Cl.
CPC .......... *G06F 17/30469* (2013.01); *G06F 17/18* (2013.01)

(58) Field of Classification Search
CPC ........................................... G06F 17/18
USPC ........................................... 707/750
See application file for complete search history.

(56) References Cited

U.S. PATENT DOCUMENTS

| | | | |
|---|---|---|---|
| 2007/0220017 A1* | 9/2007 | Zuzarte et al. | 707/100 |
| 2009/0192980 A1 | 7/2009 | Beyer | |
| 2010/0030728 A1* | 2/2010 | Chakkappen et al. | 707/2 |
| 2010/0114869 A1 | 5/2010 | Deolalikar | |

* cited by examiner

*Primary Examiner* — Ajith Jacob
(74) *Attorney, Agent, or Firm* — Michael A. Dryja

(57) ABSTRACT

A method determines a number of unique values in a sample of a list of values and estimates a number of the unique values for an unsampled portion of the list of values. The method estimates a number of the unique values in the list by adding the number of unique values in the sample to the number of the unique values in the unsampled portion.

14 Claims, 3 Drawing Sheets

ESTIMATING A NUMBER OF UNIQUE VALUES IN A LIST

BACKGROUND

In a database management system (DBMS), query estimators use variations of probabilistic counting to determine a query path. While these estimators take into account skewness and other lower order moments of the sampled data, they ignore other characteristics of data distribution and, as such, can produce inaccurate and inefficient query plans.

DETAILED DESCRIPTION

Example implementations are systems, methods, and apparatuses that estimate a number of unique values in a list.

One example embodiment implements an interval estimator for the number of unique values in the list based on a sample of values from the list. The estimator uses a statistical model for the frequencies of unique values observed in the sample and values not observed in the sample. The estimator also uses a prior distribution for the number of unique values in the list. An estimate is the interval containing the number of unique values that are most likely or that have a highest posterior density.

A variety of different embodiments can execute the estimator. By way of example, the estimator can be implemented in a primary decision model, such as the decision model used by a query optimizer in a database management system (DBMS). The DBMS estimates a number of unique values of an attribute in a database. Alternatively, example embodiments can be implemented in other applications that use estimation, such as linguistic analysis, unique species analysis, web content or document word analysis, etc.

Figure 1:
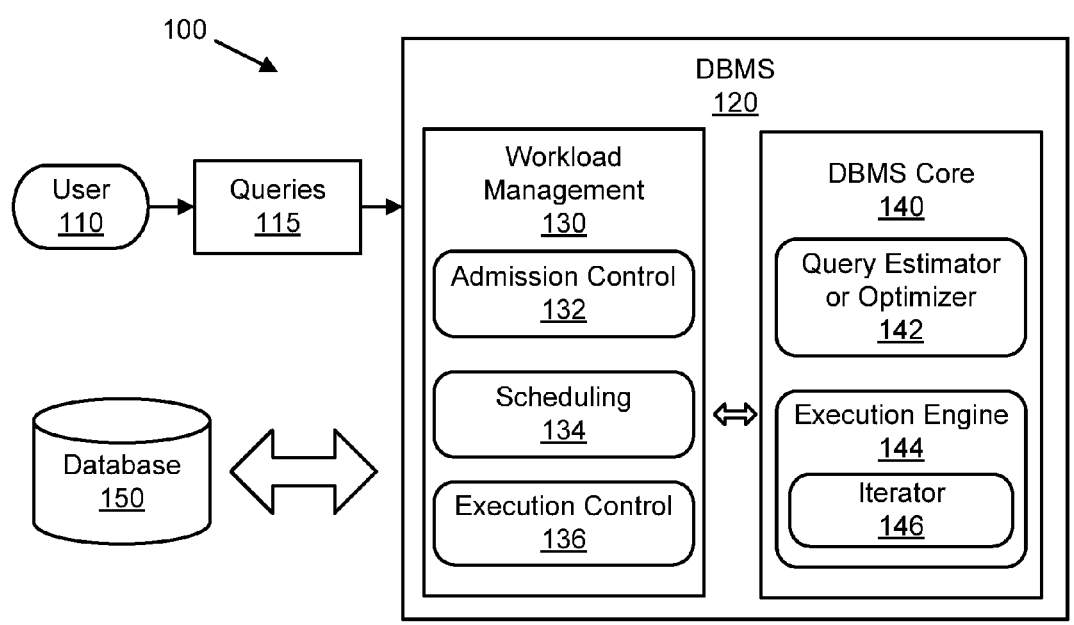
FIG. 1 is a database system that manages the execution of database queries and query plans in accordance with an example implementation.

FIG. 1 is a database system 100 for managing the execution of database queries and query plans in accordance with an example embodiment.

The system generally includes a computer, client, or user 110 that sends queries 115 to a Database Management System (DBMS) 120 which includes a workload management component 130 and a DBMS core 140. The workload management component includes plural components or modules, such as admission control 132, scheduling 134, and execution control 136. The DBMS core 140 includes plural components or modules, such as a query estimator and/or query optimizer 142, and an execution engine 144. The execution engine includes plural components or modules, such as an iterator 146.

The workload management architecture 130 provides fundamental workload management functionality for admission control, scheduling, and execution control. In one embodiment, each of these modules 132, 134, and 136 can be adjusted to select from a variety of workload management policies and algorithms.

In one embodiment, the database system executes workloads that include one or more jobs or queries. Each job consists of an ordered set of typed queries 115 submitted by the computer or user 110 and can be. Each query type maps to a tree of operators, and each operator in a tree maps in turn to its resource costs.

Policies of the admission control 132 determine the submission of queries 115 to the execution engine 144 that executes the submitted queries. The admission control 132 performs several functions in workload management. First, when a new job arrives, admission control 132 evaluates the DBMS's multiprogramming level, and submits each of the job's queries. Second, the architecture is configurable to support multiple admission queues. Policies of the admission control 132 regulate the distribution of queries among these queues, for example adding queries to queues based on estimated cost or dominant resource. Third, when the execution engine 144 has finished processing a query, admission control 132 selects the next query for execution.

Once queries have been queued, the policies of the scheduler 134 determine the ordering of the queries within a queue (for example, by estimated cost). Policies of the execution control 136 then govern the flow of the running system to one or more processors or central processing units (CPUs). Data is retrieved from a warehouse or database 150, such as a multi-dimensional database.

Figure 2:
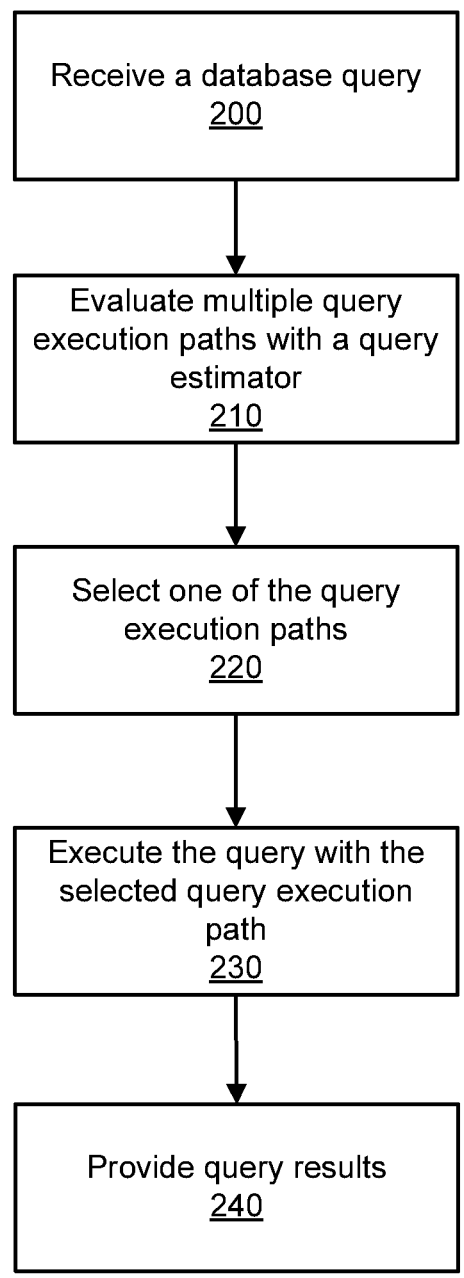
FIG. 2 is a flow diagram of a method for selecting a query path in accordance with an example implementation.

FIG. 2 shows a flow diagram of a method for selecting a query path in accordance with an example implementation. FIG. 2 is discussed in connection with FIG. 1.

According to block 200, a query is received or generated. For example, a user 110 generates a query 120 (such as a Structured Query Language (SQL) statement) to the DBMS 120 which extracts selected portions of data stored the multi-dimensional database 150. The query is provided to the query estimator or query optimizer 142.

According to block 210, the query estimator evaluates multiple query execution paths. For example, the DBMS 120 generates multiple different execute paths through tables in the database 150 for executing the query. The query estimator 142 evaluates these different paths through multiple database tables to determine an optimal path (e.g., which query path can be executed in the shortest time period). Different query plans produce a same database output (i.e., provide a same search result to the query), but each plan can have different costs relative to run time execution. For instance, an optimal path is a path with the least run time execution.

During evaluation of the query, a determination is made of the number of unique entity counts (UECs) in the database tables. One component of query optimization is the estimation of the number of unique values in the columns of the database tables. In this context, one embodiment refers to the unique values as UECs.

For example, an SQL query is converted into a number of relational operators stored in computer memory to form a query tree. Each node of the tree represents a relational operator, such as a "sort" or "merge" operator. The query optimizer explores a large number of different logically equivalent forms of the query tree (called "plans") for executing the same query; here, "logically equivalent" means the query plans produce the same database outputs, but may have very different costs relative to run time execution. The DBMS selects a query plan with a lowest estimated cost (i.e., lowest amount of computer resources utilized by the computer in executing the SQL statement and consider such factors as the number of input/outputs (I/O's) or CPU instructions).

A DBMS can arrange an order of query operations to optimize execution of a query. When the actual number of unique values for an attribute is unknown, the number is estimated. For instance, this estimate is used to determine the order in which to join tables. An accurate estimate of the number of unique values for an attribute is also useful in methods that reorder and group items. An estimate computed from a sample is typically used for large tables, rather than an exact count of the unique values, because computing the exact count is too time consuming for large tables.

According to block 220, one of the multiple query paths is selected. For example, the query estimator 142 selects an optimal query path to execute the query.

According to block 230, the query is executed with the selected query path. According to block 240, results of the query are provided to a user, transmitted, stored, or used for further processing. For example, the results of the query are displayed to the user on a display, stored in a computer, or provided to another software application.

Figure 3:
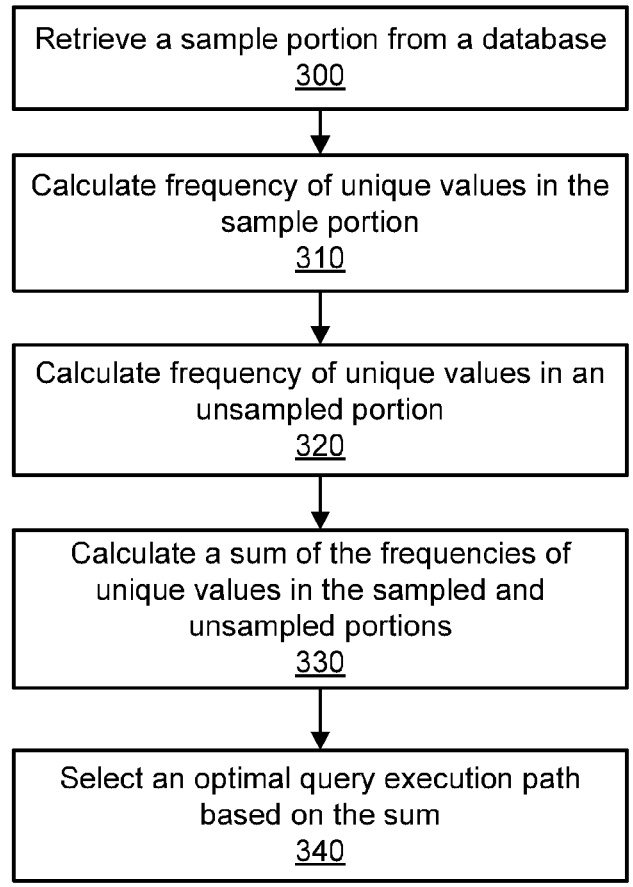
FIG. 3 is a flow diagram of a method for determining a number of unique values that occur in a list in accordance with an example implementation.

FIG. 3 shows a flow diagram of a method for determining a number of unique values that occur in a list in accordance with an example implementation.

According to block 300, a sample of records or data from a database are retrieved or received. For example, samples of data from one or more tables in a database are collected (e.g., collected at a preset time, at predetermined intervals of time, or upon a specific request).

Database tables include a large amount of data in columns and rows with unique values. For example, these tables can have many dimensions with millions or hundreds of millions of unique values. Since the tables are so large, it is not computationally feasible to analyze all of the data. Example embodiments analyze a sample portion of these tables to predict or estimate a number of unique values in both the sampled portion of data and the non-sampled portion of data. By way of illustration, if the tables have 100 million unique values, then an example embodiment can sample about one percent of these values (i.e., a sample size of one million values).

According to block 310, a calculation is made of a frequency of unique values in the sample portion retrieved from the database. For example, a determination or estimation is made from the number of unique values in the columns of a sampled portion the database tables.

According to block 320, a calculation is made of a frequency of unique values in an unsampled portion of the database. For example, a determination or estimation is made of the number of unique values in the columns of a non-sampled portion the database tables.

According to block 330, a calculation is made of a sum of frequency of unique values from the sampled and the unsampled portions (i.e. the frequency of unique values from the sampled portion are added to the frequency of unique values from the non-sampled portion).

By way of example, assume that a sample portion of records are initially retrieved or received from a table in a database. Based on the number of unique values in this sample portion, the DBMS estimates the number of unique values for an attribute in the entire table. Example embodiments are thus not required to execute a full scan of the table to estimate a number of unique values in the table.

According to block 340, the frequencies of unique values in the sampled and unsampled portions are used to select an optimal query path to execute a query.

The following example illustrates the method of FIG. 3. Let $j=1, \ldots, k$ index the unique values in a list. Let $X_j$ be the frequency of the j-th unique value occurring in the sample for $j=1, \ldots, k_+$, where $k_+$ is the number of unique values that occur in the sample (i.e, $X_j>0$, for $j=1, \ldots, k_+$). Let $Y_j$ be the frequency in the unsampled portion of the list for the j-th unique value, $j=1, \ldots, k$, where $k=k_++k_0$, with $k_0$ being the number of unique values in the list that do not occur in the sample (i.e., $X_j=0$ for $j=k_++1, \ldots, k_++k_0$). Let M be the sum of all of the $X_j$'s and $Y_j$'s, that is, M is the cardinality of the whole list. In one example embodiment, M, k+, and the positive $X_j$'s are known, but $k_0$ and the $Y_j$'s are unknown.

One example embodiment generates an interval estimator for $k_0$, and hence k. This example embodiment defines a family of joint probability distributions for $k_0$ and the $X_j$'s and $Y_j$'s, indexed by a parameter theta. For example, given their unknown occurrence rates, the $X_j$'s and $Y_j$'s can be independent Poisson random variables, and the theta can be the hyperparameter for a family of Gamma prior distributions for the occurrence rates. In this case, $X_j$ and $Y_j$ are conditionally independent given their common occurrence rate, but not marginally.

For a fixed $k_0$, the log-likelihood function based on the joint probability distribution of $\{(X_j, Y_j): j=1, \ldots, k\}$ is decomposed into three components as follows:

1. The log-likelihood (L1) based on the marginal distributions of the $X_j$'s: specifically, sum $\{\log p(X_j|\text{theta})\}$, where the sum ranges over $j=1, \ldots, k_++k_0$.
2. The log likelihood (L2) based on the conditional probability distributions of the $Y_j$'s given the $X_j$'s, for j's with $X_j>0$: specifically, sum $\{\log p(Y_j|X_j, \text{theta})\}$, where the sum ranges over $j=1, \ldots, k_+$.
3. The log-likelihood (L3) based on the conditional probability distributions of the $Y_j$'s given the $X_j$'s, for j's with $X_j=0$: specifically, sum $\{\log p(Y_j|X_j=0, \text{theta})\}$, where the sum ranges over $j=k_++1, \ldots, k$.

One example embodiment adds L1, L2, and L3 to generate an overall log-likelihood function for ($k_0$, theta): specifically, L=L1+L2+L3. This addition involves the Y's as well which are not known. A sum over these values is performed in order to generate a likelihood for ($k_0$, theta).

When a prior distribution for theta is available, the example embodiment integrates exp(L) with respect to this prior to form a likelihood for $k_0$ by itself. If such a prior distribution is not available, the example embodiment plugs in estimates of theta based on method of moments, or maximum quasi-likelihood, or maximum likelihood, which results in a partial log-likelihood for $k_0$. In some situations, there will be a prior distribution for $k_0$ based on past experience, which can be combined with L to form a posterior distribution for $k_0$. In any of these cases, example embodiments generate the set of $k_0$'s having the highest likelihood or posterior.

Example embodiments generate reasonable probability models for the underlying data distributions and thus overcome the deficiencies of existing non-parametric estimators. Furthermore, example embodiments execute for a variety of skewness conditions and are applicable even when the underlying probabilistic assumptions are not satisfied.

Figure 4:
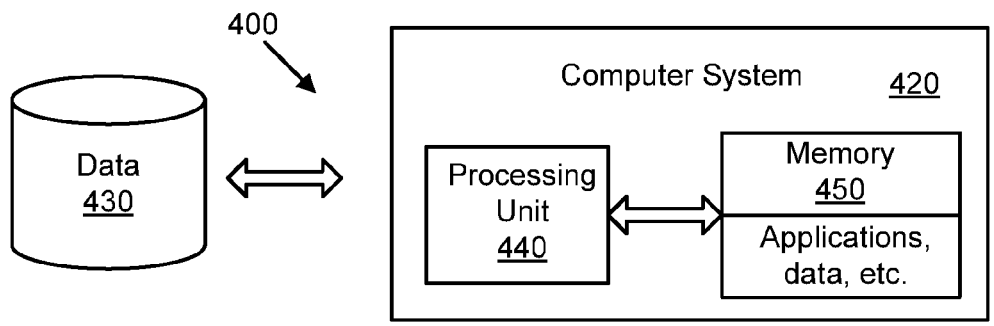
FIG. 4 is a computer system in accordance with an example implementation.

FIG. 4 is a computer system 400 that executes one or more portions of methods, flow diagrams and/or aspects of example embodiments.

The system 400 includes a computer system 420 (such as a host or client computer) and a repository, warehouse, or database 430. The computer system 420 comprises a processing unit 440 (such as one or more processors of central processing units, CPUs) for controlling the overall operation of memory 450 (such as random access memory (RAM) for temporary data storage and read only memory (ROM) for permanent data storage). The memory 450, for example, stores applications, data, control programs, algorithms (including diagrams and methods discussed herein), and other data associated with the computer system 420. The processing unit 440 communicates with memory 450 and data base 430 and many other components via buses, networks, etc.

As used herein and in the claims, the following terms are defined as follows:

A "database" is a structured collection of records or data that are stored in a computer system so that a computer program or person using a query language (such as SQL) can consult it to retrieve records and/or answer queries. Records retrieved in response to queries provide information used to make decisions. Further, the actual collection of records is the database, whereas the DBMS is the software that manages the database.

A "database management system" or "DBMS" is computer software and/or hardware designed to manage databases.

A "query" is a request for retrieval of information from a database.

A "query optimizer" or "query estimator" is a component of a database management system (DBMS) that attempts to determine an efficient or optimal way to execute a query. Query optimizers evaluate different possible query plans for a given input query and determine which one of those plans is most efficient. Cost-based query optimizers assign an estimated "cost" to each possible query plan, and choose the plan with the smallest cost. Costs are used to estimate the runtime cost of evaluating the query, in terms of the number of I/O operations required, the CPU requirements, and other factors. The set of query plans examined is formed by examining the possible access paths (e.g. index scan, sequential scan) and join algorithms (e.g., sort-merge, hash join, nested loops).

A "query plan" is a set of steps used to access information in database management system. For example, in an SQL database, multiple alternate ways with varying performance exist to execute a given query. When a query is submitted to the database, a query optimizer evaluates some of the different possible plans for executing the query and returns one or more possible results.

A "table" when used in the context of a database is a logical representation of data in a database in which a set of records is represented as a sequence of rows, and the set of fields common to all the records is represented as a series of columns. The intersection of a row and column represents the data value of a particular field of a particular record. The columns are identified by name, and the rows are identified by values in a particular column subset which is identified as a candidate key.

"Structured Query Language" or "SQL" is a database computer language designed for the retrieval and management of data in a relational database management system, database schema creation and modification, and database object access control management. SQL provides a programming language for querying and modifying data and managing databases (for example, retrieve, insert, update, and delete data, and perform management and administrative functions).

A "unique entry count" or "UEC" is the number of unique values within a column of a table.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using a bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A method executed by a computer system, comprising:
    storing, in the computer system, a list of values;
    determining, with the computer system, a number of unique values and a frequency of the unique values for a sample of the list of values;
    estimating, with the computer system, a number of unique values and a frequency of the unique values for an unsampled portion of the list of values, by adding a value based on a distribution family for the frequency of the unique values for the sample to a value based on a conditional probability distribution family for the frequency of the unique values in the unsampled portion given the frequency of the unique values for the sample; and estimating, with the computer system, a number of unique values in the list by adding the determined number of unique values in the sample to the estimated number of unique values in the unsampled portion.

2. The method of claim 1 further comprising:

defining, given each possible number of the unique values in the list, a family of joint probability distributions for the frequencies of the unique values in the list, wherein the family is indexed by a parameter that determines a family of distributions for the frequency of the unique values in the sample and a family of conditional distributions for the frequency of the unique values in the unsampled portion of the list given the frequency of the unique values in the sample.

3. The method of claim 1 further comprising:

calculating a family of joint probability distributions to determine the number of the unique values in the unsampled portion of the list.

4. The method of claim 1 further comprising:

determining a log-likelihood for the number of the unique values in the
unsampled portion of the list.

5. The method of claim 1 wherein the value based on the distribution family for the frequency of the unique values for the sample, and the value based on the conditional probability distribution for the frequency of the unique values in the unsampled portion are each a log likelihood.

6. The method of claim 1 further comprising:

receiving a prior distribution of the number of the unique values in the unsampled portion to estimate the number of the unique values in the unsampled portion.

7. A method executed by a database system, comprising:

receiving a query to a database;

calculating, by the database system, a frequency of unique values in a sampled portion of the database;

estimating, by the database system, a frequency of the unique values in an unsampled portion of the database, including indexing a family of joint probability distributions for the frequency of the unique values in the unsampled portion by a parameter that includes Gamma prior distributions for an occurrence rate of the frequency of the unique values in the unsampled portion; and selecting, based on the frequency of the unique values in both the sampled portion and the unsampled portion, a query path to execute the query.

8. The method of claim 7 further comprising:

estimating a number of unique entry counts (UECs) of columns in database tables in the database.

9. The method of claim 7 further comprising:

retrieving a prior distribution of a number of the unique values in the unsampled portion to estimate the frequency of the unique values in the unsampled portion of the database.

10. The method of claim 7 further comprising:

decomposing a log-likelihood for the number of the unique values in the unsampled portion and the frequency of the unique values in the unsampled portion of the list into three components that include a log-likelihood (L1) based on a marginal distribution of the frequency of the unique values occurring in the sampled portion, a log-likelihood (L2) based on a conditional probability distribution of the frequency of the unique values occurring in the unsampled portion for the unique values occurring in the sampled portion, and a log-likelihood (L3) based on a conditional probability distribution of the frequency of the unique values occurring in the unsampled portion for the unique values that do not occur in the sampled portion; and adding L1, L2, and L3 together.

11. A database system implemented by a computing system including a processing unit, comprising:

a database that stores a table of data; and a database management system (DBMS) that receives a first portion of the table without receiving a second portion of the table, calculates a number of unique values in the first portion of the table, estimates a number of unique values in the second portion of the table, and generates a query execution path through the table based on the calculated number of unique values in the first portion and the estimated number of unique values in the second portion, wherein the DBMS calculates a first sum of probabilities of the number of unique values in the first portion of the table given the parameter, a second sum of probabilities of the number the unique values in the second portion of the table given the number of unique values in the first portion of the table and the parameter, and a third sum of probabilities of the number of the unique values in the second portion of the table given the number of unique values in the first portion of the table being set to zero and the parameter.

12. The database system of claim 11, wherein the DBMS uses a prior distribution of the number of unique values in the table and a statistical model to generate the calculated number of unique values in the first portion and the estimated number of the unique values in the second portion.

13. The database system of claim 11, wherein the DBMS includes a query optimizer that estimates a number of unique values in columns of the table.

14. The database system of claim 11, wherein the first sum is $\{\log p(X_j|theta)\}$, the second sum is $\{\log p(Y_j|X_j, theta)\}$, and the third sum is $\{\log p(Y_j|X_j=0, theta)\}$, where $X_j$ is the number of unique values in the first portion of the table, $Y_j$ the number of the unique values in the second portion of the table, and theta is the parameter and indexes a probability distribution of the number of unique values in the first and second portions.

* * * * *